April 28, 1936.  T. D. MINEAR  2,038,948
SHOCK ABSORBER
Filed June 6, 1934
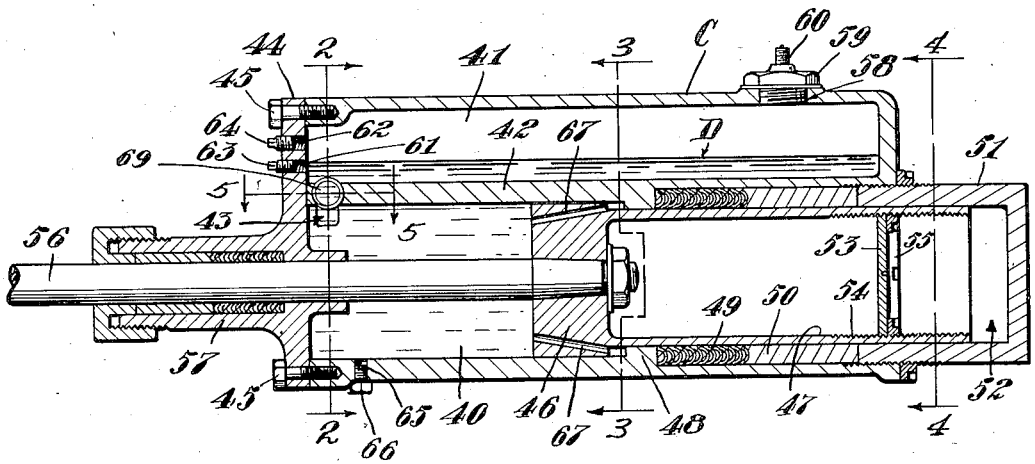
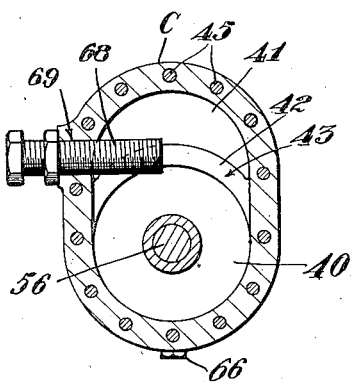 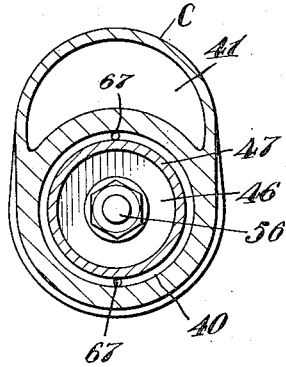 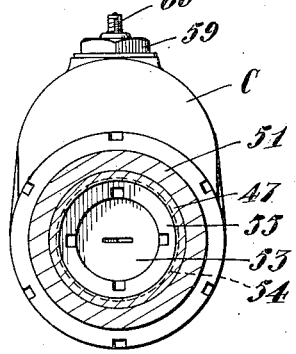
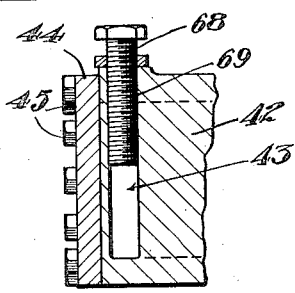
Inventor.
Thomas D. Minear.
By R. S. Berry
Att'y.

Patented Apr. 28, 1936

2,038,948

UNITED STATES PATENT OFFICE 2,038,948

SHOCK ABSORBER

Thomas D. Minear, Los Angeles, Calif.

Application June 6, 1934, Serial No. 729,242

2 Claims. (Cl. 267—64)

This invention relates to a shock absorber and more particularly pertains to that class of shock absorbers embodying a hydraulically influenced air cushion which shock absorbers are applicable for use either in conjunction with or in lieu of the shock absorbing metallic springs of vehicles.

An object of the invention is to provide a shock absorber of the above character embodying a plunger working in a liquid containing chamber adapted on movement of the plunger in one direction to force the liquid through a restricted passage into an air or gas containing chamber, in which the piston is so formed and mounted as to obviate possibility of leakage of the liquid from the device and especially under the action of retrograde movement of the piston.

Another object is to provide a shock absorber of the hydraulic and air cushion type which is adapted to be interposed between a pair of relatively moveable bodies whether in a vertical or horizontal position, or at various angles between the vertical or horizontal, and which will function to cushion relative movement of the bodies in either direction.

Another object is to provide a construction in the plunger whereby the liquid acted on thereby may pass to the opposite sides of a piston head carried by the plunger during reciprocation of the latter, so as to obviate formation of vacuum back of the piston on its forward stroke and also obviate accumulation of the liquid back of the piston head such as to interfere with retrograde movement of the latter.

Another object is to provide a device of the above character which is simple in construction and efficient in operation and which is not apt to get out of order.

With the foregoing objects in view, together with such other objects and advantages as may subsequently appear, the invention resides in the parts and in the combination, construction and arrangement of parts hereinafter described and claimed and claimed and illustrated by way of example in the accompanying drawing in which:

Fig. 1 is a view in longitudinal section of the shock absorber showing it as designed for operation in a horizontal or near horizontal position:

Fig. 2 is a view in cross section taken on the line 2—2 of Fig. 1 as seen in the direction indicated by the arrows:

Fig. 3 is a view in cross section taken on the line 3—3 of Fig. 1 as seen in the direction indicated by the arrows:

Fig. 4 is a view in section and elevation as seen on the line 4—4 of Fig. 1 as seen in the direction indicated by the arrows:

Fig. 5 is a detail in horizontal section taken on the line 5—5 of Fig. 1.

Referring to the drawing more specifically a housing C is shown as having a pair of superimposed horizontally elongated chambers 40 and 41 separated by a partition 42 formed with a passage 43 adjacent one end wall 44 of the housing, and which end wall is demountably detached to the side walls of the housing C by bolt 45 and constitutes a closure for the outer ends of the chambers 40 and 41. The chamber 40 is cylindrical and has a piston 46 mounted for horizontal reciprocal movement therein and which piston is carried on a hollow plunger 47 extending through an end wall 48 of the chamber 40 opposite the end wall 44 and projecting through a packing gland comprising packing material 49 seating against the end wall 48, a crowding ring 50 bearing against the packing 49 and a cylindrical cap 51 screwed into the housing C and bearing against the crowding ring 50. The outer end of the plunger 47 opens to the interior of the cap 51 thus forming an enclosed chamber 52 which on forward movement of the plunger serves as a vacuum chamber to yieldably oppose such movement of the plunger, and on retrograde movement of the latter serves as a dash-pot to cushion such retrograde movement of the plunger.

As a means for varying the capacity of the chamber 52 a partition 53 is provided in the form of a disc having screw threaded engagement with internal threads 54 on the plunger 47 whereby the disc may be advanced or retracted longitudinally of the latter; a locking ring 55 engaging the threads 54 and being adapted to be screwed tight against the disc 53 to hold the latter against free turning on the threads 54. The disc 46 is mounted on a longitudinally reciprocal stem 56 slidably extending through a packing gland 57 carried by the end wall 44, which stem is adapted to be connected in any suitable fashion to one of a pair of relatively moveable members while the housing C is adapted to be connected in any suitable manner to the other of the pair of relatively moveable members.

The upper wall of the housing C is provided with a filler opening 58 through which a volume of liquid D, such as oil, is placed in the chambers 40 and 41 to completely fill the former and partially fill the latter. The opening 58 is normally closed by a threaded plug 59 fitted with a normally closed air inlet valve 60 and through which valve air under pressure is delivered to the chamber 41 above the volume of liquid D therein. A pair of superimposed overflow openings 61 and 62 are provided in the end wall 44 and closed by plugs 63 and 64 respectively whereby the level of the liquid in the chamber 41 may be regulated and determined by removing either of the plugs.

The lower wall of the chamber 40 is provided with a drain outlet 65 closed by a removable plug 66.

The piston 46 is provided with passages 67 for permitting the flow of the liquid from one side of the piston to the other during reciprocal movement of the latter.

Means are provided for regulating the area of the passage 43 leading from the chamber 40 to chamber 41 and which as shown in Figs. 2 and 5 comprises a screw 68 screwed into an opening 69 in the housing to extend into the passage 42 in such manner that by adjusting the screw 68 longitudinally it will project more or less into the passages 42 and thereby vary the extent of the opening of the latter.

The resiliency of the device is varied by varying the quantity of liquid contained in the chambers 40 and 41. In assembling the device the relative volumes of liquid and air in the chambers is such that the liquid will completely fill the chamber 40 when the piston 46 is in its outermost position as shown in Fig. 1, with the liquid extending a short distance above the partition 42 to afford requisite air space above the liquid in the chamber 41.

In the operation of the invention the volume of air entrapped in the upper portion of the chamber 41 constitutes a yieldable cushion while the volume of liquid in the chambers 40 and 41 constitute a hydraulic piston and affords a liquid seal between the air cushion and the joint around the piston 46.

When the relatively movable bodies advance towards each other the plunger 47 with the piston 46 thereon is advanced into the chamber 40 thereby displacing the liquid in the latter and causing a portion of the liquid to pass through the opening 43 into the lower end of the chamber 41 in opposition to the volume of air in the latter, while another portion passes through the passages 67 into the space back of the piston 46. Inward movement of the plunger and piston is thus yieldably resisted by the cushioning action of the air confined in the chamber 41 which volume of air is compressed by the action of the upwardly rising column of liquid in the chamber 41, and as its density increases a correspondingly increased resistance to inward movement of the plunger is effected.

The degree of resiliency afforded by the air cushion may be regulated by varying the pressure of the charge of air delivered to the chamber 41 and also by varying the volume or quantity of the liquid contained in the chamber; the greater the air pressure the greater its resistance to compression, and the lesser the volume of liquid the greater the freedom of movement of the plunger.

On retrograde movement of the plunger the liquid entrapped back of the piston is forced through the openings 67 which latter by reason of being of comparatively small cross section act to restrict the return flow of the liquid thus retarding the outward or retrograde movement of the plunger.

I claim:

1. In a shock absorber of the character described, a housing having a pair of chambers communicating with each other adjacent one end thereof, a liquid completely filling one of said chambers and partially filling the other, a piston in the liquid filled chamber, a tubular plunger carrying said piston, open at its outer end, a packing gland encompassing said plunger, and a cap on said housing extending over and enclosing the open outer end of said plunger.

2. In a shock absorber of the character described, a housing having a pair of chambers communicating with each other adjacent one end thereof, a liquid completely filling one of said chambers and partially filling the other, a piston in the liquid filled chamber, a tubular plunger carrying said piston, open at its outer end, a packing gland encompassing said plunger, a cap on said housing extending over and enclosing the open outer end of said plunger, and adjustable means in said plunger for varying the volumetric capacity of the communicating space interiorly of said cap and the outer end portion of said plunger.

THOMAS D. MINEAR.